United States Patent [19]

Wendt

[11] Patent Number: 4,471,271
[45] Date of Patent: Sep. 11, 1984

[54] SELF-REGULATING SATURATING CORE TELEVISION RECEIVER POWER SUPPLY

[75] Inventor: Frank S. Wendt, Princeton, N.J.

[73] Assignee: RCA Corporation, New York, N.Y.

[21] Appl. No.: 348,902

[22] Filed: Feb. 16, 1982

[51] Int. Cl.³ .............................................. H01J 29/70
[52] U.S. Cl. ................................... 315/411; 358/190; 336/212
[58] Field of Search ........................ 315/411, 400, 282; 336/212; 363/75; 323/306, 307, 248, 249, 250, 251, 253; 358/190

[56] References Cited

U.S. PATENT DOCUMENTS

| | | | |
|---|---|---|---|
| 2,403,393 | 7/1946 | Peterson | 171/119 |
| 2,432,343 | 12/1947 | Short | 323/60 |
| 2,436,925 | 3/1948 | Haug et al. | 171/119 |
| 3,584,290 | 6/1971 | Spreadbury | 323/6 |
| 3,668,589 | 6/1972 | Wilkinson | 336/212 |
| 4,240,013 | 12/1980 | Wedam | 315/411 |
| 4,262,245 | 4/1981 | Wendt | 323/308 |
| 4,390,819 | 6/1983 | Babcock et al. | 315/411 |

OTHER PUBLICATIONS

IEEE Transactions on Magnetics, vol. Mag. 14, No. 2, Mar. 1978, "The Geometry of Regulating Transformers", Nathan R. Grossner.

Primary Examiner—Theodore M. Blum
Assistant Examiner—Gilberto Barrón, Jr.
Attorney, Agent, or Firm—Eugene M. Whitacre; Paul J. Rasmussen; Joseph J. Laks

[57] ABSTRACT

A self-regulating, saturating core power supply for a television receiver includes a magnetizable core having first, second and third core sections. A primary winding is wound around the first core section and an output secondary winding is wound around the second core section. The third core section provides a magnetic circuit path for magnetic flux lines that link both windings. The primary winding is coupled to a source of alternating input voltage for developing an alternating polarity output voltage across the secondary winding. A resonating capacitor is coupled to the secondary winding for generating a current therein that aids in producing substantial magnetic saturation of the third core section twice during each cycle of the alternating polarity output voltage to thereby regulate the output voltage. The second core section remains substantially unsaturated during the entirety of each cycle. The regulated output voltage may be used to develop direct supply voltages for the television receiver such as the B+ scan supply voltage and the ultor high voltage.

18 Claims, 7 Drawing Figures

SELF-REGULATING SATURATING CORE TELEVISION RECEIVER POWER SUPPLY

This invention relates to self-regulating, saturating core power supplies for television receivers.

Self-regulating transformers such as ferroresonant transformers may be used to provide regulated ultor voltages and regulated B+ scan supply voltages for television receivers. Such power supplies are described in the U.S. patent application Ser. No. 144,150, filed Apr. 28, 1980, entitled "HIGH FREQUENCY FERRORESONANT POWER SUPPLY FOR A DEFLECTION AND HIGH VOLTAGE CIRCUIT", of F. S. Wendt; the U.S. Pat. No. 4,262,245 entitled "HIGH FREQUENCY FERRORESONANT TRANSFORMER", of F. S. Wendt; and the U.S. patent application Ser. No. 250,130, filed Apr. 2, 1981, entitled "TELEVISION RECEIVER FERRORESONANT POWER SUPPLY USING A TWO-MATERIAL MAGNETIZABLE CORE ARRANGEMENT", of W. E. Babcock and F. S. Wendt. When operated at a relatively high input frequency, such as the horizontal deflection frequency of around 16 KHz, a self-regulating transformer is a relatively compact, low weight unit which provides inherent output voltage regulation without the need for relatively complex and expensive electronic regulator control circuitry.

The saturation flux density, Bsat, of many magnetizable materials such as ferrites decreases with increasing temperature. Since the output high voltage of a self-regulating transformer may depend in part on the Bsat value of the saturating core material used, an excessive rise in saturating core operating temperature may undesirably result in an excessive decrease in the ultor high voltage and in other output voltages.

The value of the ultor voltage for a color television receiver may be between 20 and 30 kilovolts. The number of turns of the transformer high voltage winding used to develop the ultor voltage is therefore relatively large compared to the number of turns of other windings used to develop the low voltages supplies for the television receiver. In a self-regulating transformer arrangement where the high voltage winding is wound around the saturating core portion of the transformer, the volts per turn being developed in the saturating core may be relatively small due to the saturating core being designed with a relatively small cross-sectional area to aid in the magnetic saturation of the core. In such a self-regulating transformer arrangement, the high voltage winding may require a relatively large number of turns in order to produce the desired level of ultor voltage.

A feature of the invention is a self-regulating power supply for a television receiver that allows a core construction that provides relatively easy access to the saturating core for heat sinking and for a relatively unrestricted flow of air. The increased heat sinking ability of such a design may reduce the increase in operating temperature of the saturating core that occurs during television receiver warmup and therefore reduce the decrease in output voltage that may occur.

Another feature of the invention is a self-regulating power supply that produces an ultor voltage for a television receiver without requiring an excessively large number of high voltage winding turns. A 75 percent or more reduction in the number of high voltage winding turns may be realized, depending on the design parameters used.

A magnetizable core includes first, second and third core sections. A first winding is wound around the first core section and a second winding is wound around the second core section. The third core section provides a magnetic circuit path for magnetic flux lines that link both windings. The first winding is coupled to a source of alternating input voltage for developing an alternating polarity output voltage across the second winding. A capacitance is coupled to the second winding for generating a current therein that aids in producing substantial magnetic saturation of the third core section during each cycle of the alternating polarity output voltage to thereby regulate that voltage. The second core section, however, remains substantially unsaturated during the entirety of each cycle.

To develop an ultor voltage at an ultor terminal, a high voltage winding is wound around the second core section for stepping up the regulated output voltage. A high voltage rectifier arrangement is coupled to the high voltage winding and to the ultor terminal to develop a regulated ultor voltage from the voltage being produced across the high voltage winding.

FIG. 5b is an exploded perspective view, without the windings, of the structure of FIG. 5a.

Figure 1:
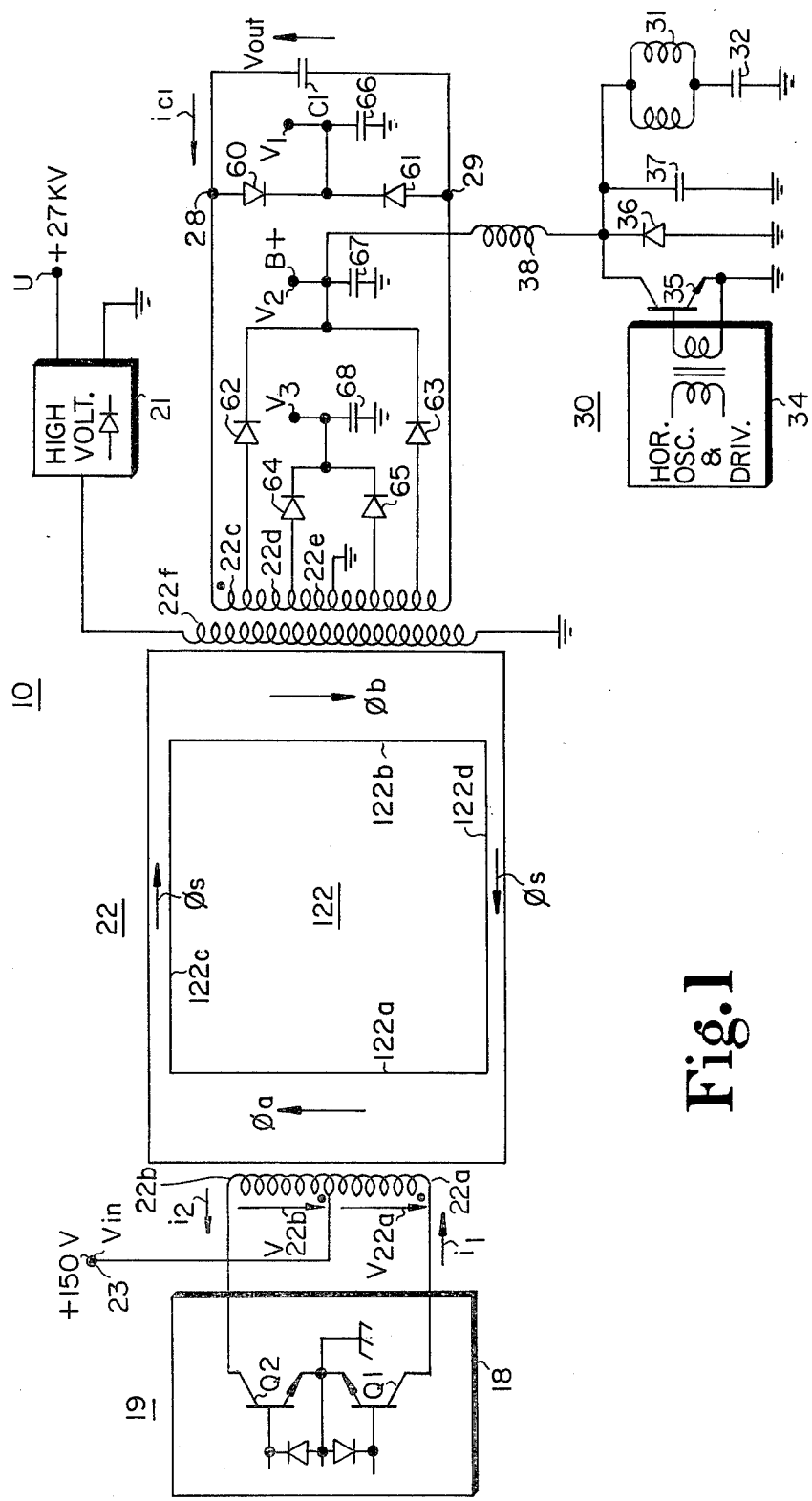
FIG. 1 illustrates a self-regulating, saturating core power supply for a television receiver.

In the Drawing figures, the direction of a current arrow is the direction of conventional current. The direction of a voltage arrow between terminals is such that the negative terminal is considered the reference terminal, nearest which the tail of the arrow is located.

In the television receiver, self-regulating power supply 10 of FIG. 1, a source 19 of alternating input voltage is coupled to primary winding sections 22a and 22b of a self-regulating, saturating core transformer 22 for developing alternating polarity output voltages across a high voltage secondary output winding 22f and across each of the grounded center tap windings 22c–22e. The conductor turns of winding 22e extend between the pair of intermediate taps on either side of the center tap and nearest thereto; the conductor turns of winding 22d extend between the other pair of intermediate taps; and the conductor turns of winding 22c extend the full winding length between terminals 28 and 29. Alternating input source 19 includes a source of unregulated direct voltage, not illustrated in FIG. 1, that develops a direct input voltage $V_{in}$ at terminal 23 and an inverter 18 coupled to primary winding sections 22a and 22b.

Input terminal 23 is coupled to a center tap connection of primary winding sections 22a and 22b. The collector electrodes of inverter switching transistors Q1 and Q2 are coupled respectively to the other end terminals of the primary winding sections to form a push-pull arrangement with the primay winding sections. Inverter 18 is operated at a relatively high frequency such as the horizontal deflection frequency, $1/T_H$, of around 16

Figure 2:
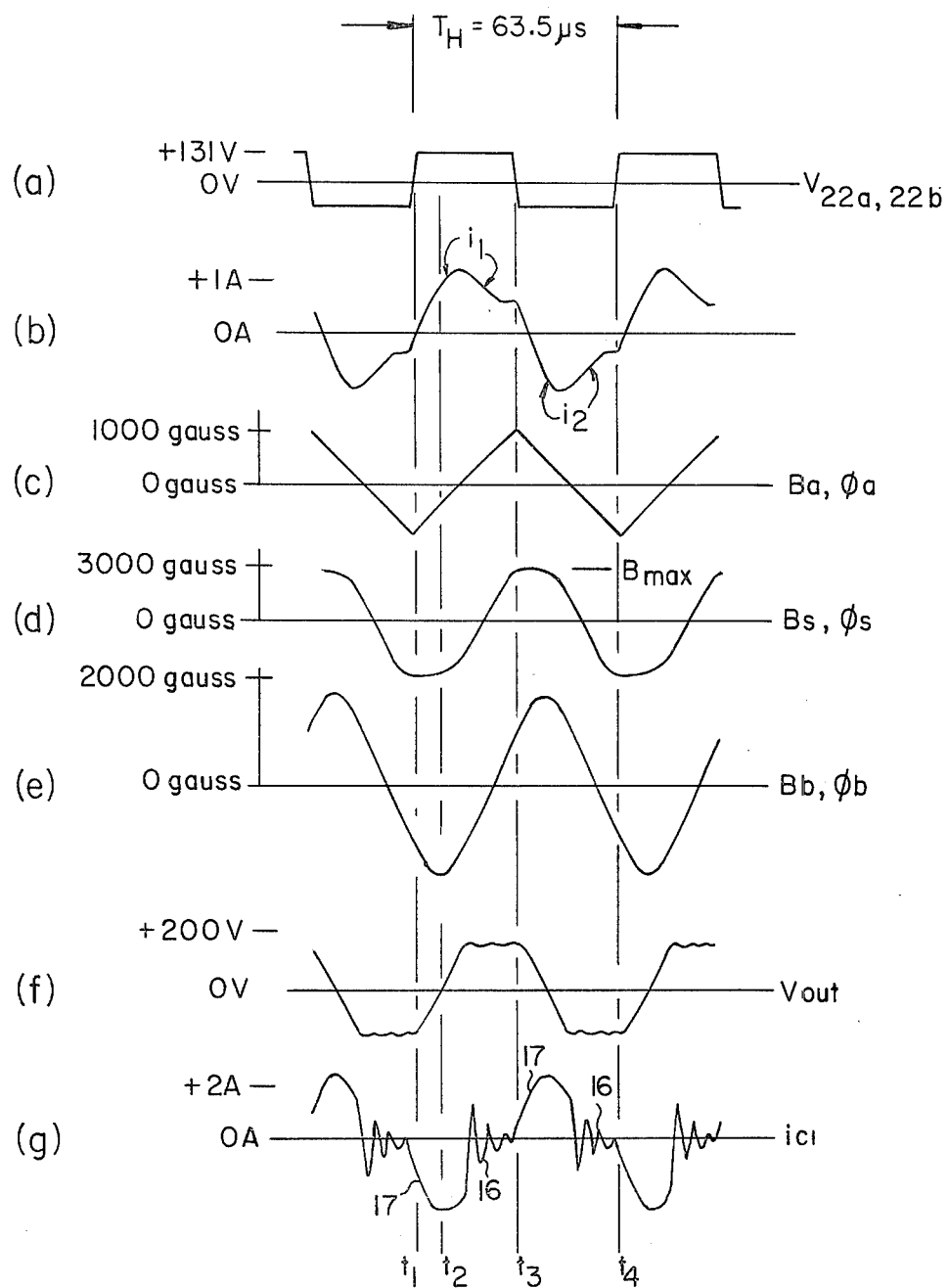
FIGS. 2 and 3 illustrate waveforms associated with the operation of the circuit of FIG. 1.

KHz, where the $T_H$ of FIG. 2 is the horizontal deflection interval.

The alternating polarity output voltages developed across secondary windings 22c–22e are full-wave rectified by respective pairs of the diodes 60–65 and filtered by respective ones of capacitors 66–68 to produce respective direct supply voltages V1–V3 that energize the various television receiver load circuits. The voltage V2 serves as a B+ scan supply voltage for a horizontal deflection generator 30 to produce horizontal scanning current in a horizontal deflection winding 31. Horizontal deflection generator 30 is coupled to the B+ terminal through an inductor 38 and comprises a horizontal oscillator and driver 34, a horizontal output transistor 35, a damper diode 36, a retrace capacitor 37, and an S-shaping or trace capacitor 32 coupled in series with horizontal deflection winding 31 across horizontal output transistor 35.

Secondary winding 22f, magnetically tightly coupled to windings 22c–22e, serves as a step-up high voltage winding coupled to a high voltage rectifier arrangement 21 that produces at an ultor terminal U an ultor voltage for the picture tube, not illustrated in FIG. 1, of the television receiver.

To regulate the output voltage $V_{out}$ developed across secondary winding 22c and all the other output voltages developed across the other secondary windings 22d–22f, power supply 10 comprises a self-regulating saturating core power supply embodying the invention that includes transformer 22 and a resonating capacitor C1 coupled between two terminals, such as the end terminals of secondary winding 22c. The magnetizable core 122 of self-regulating transformer 22, illustrated schematically in FIG. 1, includes a primary core section or leg 122a, an opposing secondary core section or leg 122b, and saturating core sections or legs 122c and 122d, with each saturating core section being of reduced cross-sectional area compared to the cross-sectional area of the primary and secondary core sections 122a and 122b. Primary winding sections 22a and 22b are wound around the primary core section 122a, whereas the secondary windings 22c–22f, across which regulated voltages are developed, are wound around secondary core section 122b. None of the turns of the secondary winding is wound around the saturating core section 122c or 122d.

Figure 4:
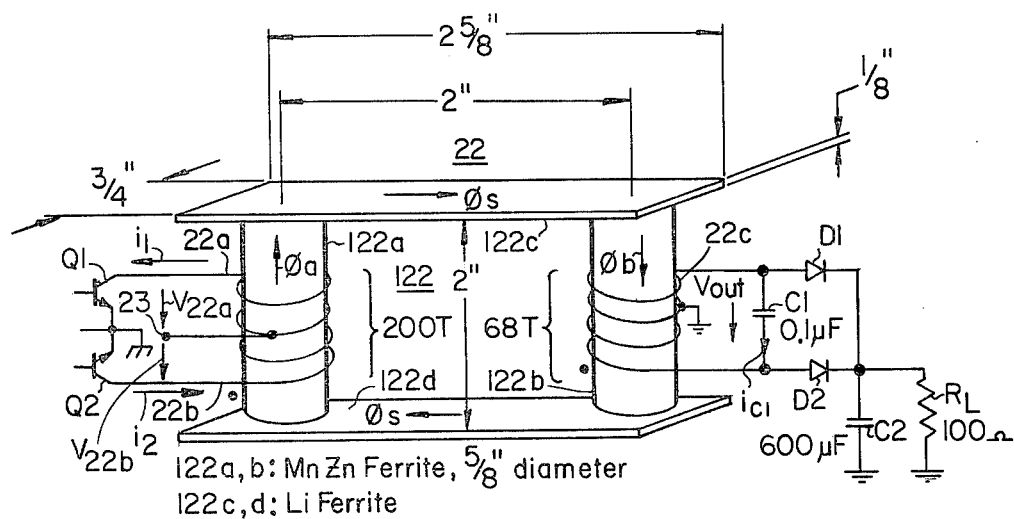
FIG. 4 illustrates a self-regulating power supply embodying the invention including a detailed illustration of the transformer core.

FIG. 4 illustrates a self-regulating transformer arrangement 22 embodying the invention including a detailed illustration of the transformer core structure. Items in FIGS. 1 and 4 having the same identification, function in a similar manner or represent similar quantities.

Core 122 of FIG. 4 includes two vertically oriented nonsaturating posts 122a and 122b of generally circular cross-section and two thin, horizontally oriented, saturating slabs 122c and 122d, of generally rectangular cross-section that are in contact with posts 122a and 122b. Primary winding sections 22a and 22b are wound around posts 122a and are coupled to push-pull inverting transistors Q1 and Q2 to produce a substantially square-wave voltage V22a and V22b across the respective winding sections. Grounded center tap output secondary winding 22c is wound around post 122b. Saturating slabs 122c and 122d are free of both primary section winding turns and secondary winding turns.

The regulated alternating polarity output voltage $V_{out}$ is developed across resonating capacitor C1 coupled between two terminals, such as the end terminals of secondary winding 22c. The anode electrodes of diodes D1 and D2 are coupled to respective end terminals of winding 22c to develop a regulated direct voltage across a filter capacitor C2 coupled to the common junction terminal of the cathode electrodes of diodes D1 and D2. A load resistor $R_L$ is energized by the regulated direct voltage being developed across capacitor C2.

The magnetizable material from which the nonsaturating posts 122a and 122b of core 122 are formed may be selected as a manganese-zinc ferrite exhibiting a saturation flux density Bsat of around 4300 gauss at 25° C. temperature.

Saturating slabs 122c and 122d may be formed from a magnetizable material such as lithium ferrite or from a substituted lithium ferrite such as lithium-manganese ferrite, as described in the I. Gordon U.S. patent application Ser. No. 250,128, filed Apr. 2, 1981, entitled "IMPROVED LITHIUM FERRITE AND METHOD OF MANUFACTURE" or as described in the R. Shahbender et al. U.S. patent application Ser. No. 250,131, filed Apr. 2, 1981, entitled "TELEVISION RECEIVER FERRORESONANT HIGH VOLTAGE POWER SUPPLY USING TEMPERATURE STABLE CORE MATERIAL", both applications herein incorporated by reference. The saturation flux density, Bsat, of lithium ferrite, is around 2900 gauss at 25° C. Lithium ferrite and substituted lithium ferrite have the advantageous property of a relatively low percentage change of saturation flux density with temperature and are therefore well suited as a magnetizable material for saturating core sections 122c and 122d. The values of Bsat given above for manganese-zinc ferrite and lithium ferrite are the values of the flux density of the corresponding B-H curve characteristic at a drive level of around 25 oersted.

Figure 3:
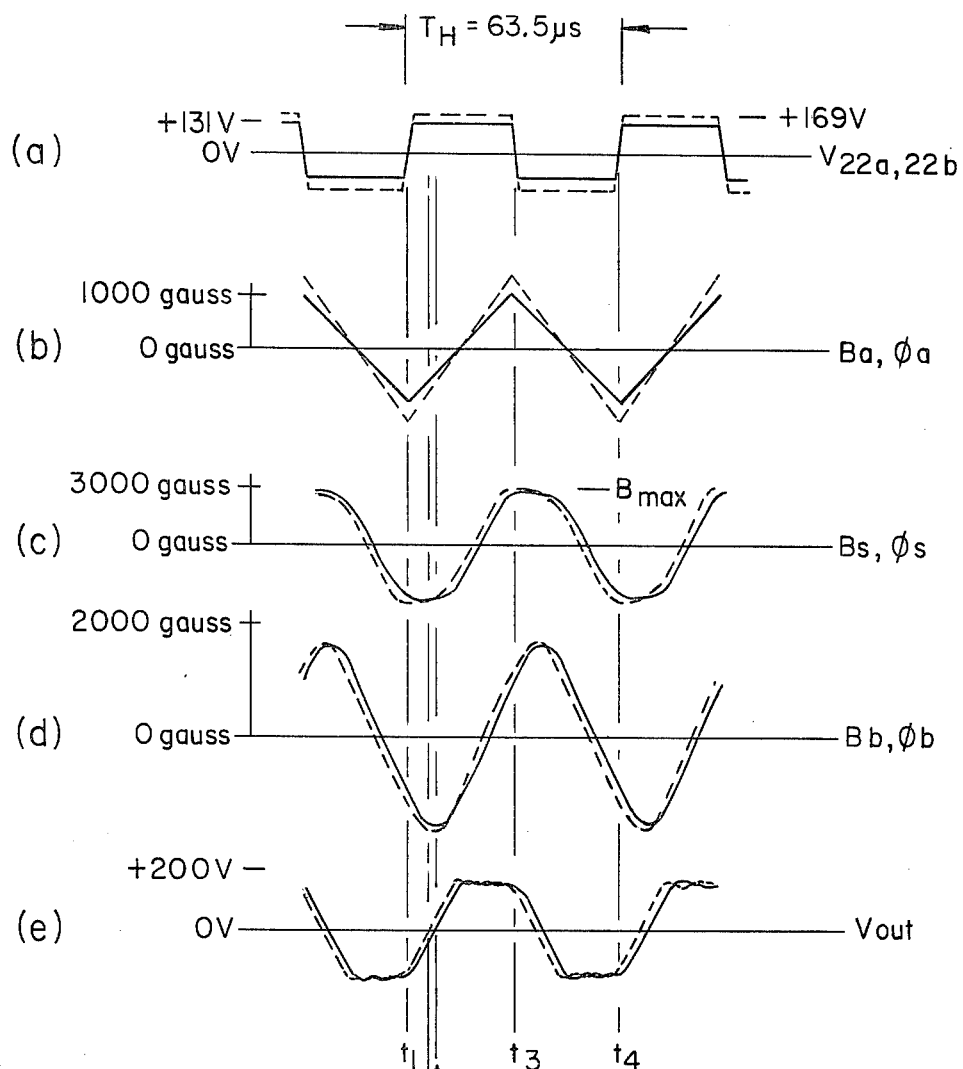

FIGS. 2 and 3 illustrate waveforms associated with operation of the inverter driven transformer of FIG. 4 when the inverter is operated at the horizontal deflection frequency of around 16 KHz. Correspondingly similar waveforms are developed when the transformer core of FIG. 4, suitably modified, is used in the television receiver power supply 10 of FIG. 1.

The switching operation of transistors Q1 and Q2 of FIG. 4 develops substantially square-wave voltages V22a and V22b across primary winding sections 22a and 22b as illustrated in FIG. 2a. Assume transistor Q1 is made conductive during the interval $t_1$–$t_3$ of FIG. 2 and that transistor Q2 is made conductive during the interval $t_3$–$t_4$. As illustrated in FIG. 2b, current $i_1$ flows in primary winding section 22a between times $t_1$–$t_3$ and current $i_2$ flows in primary winding section 22b between times $t_3$–$t_4$. Primary winding section currents $i_1$ and $i_2$ include a magnetizing current component that generates a magnetizing flux $\phi_a$ in primary core section 122a that links primary winding sections 22a and 22b.

The direction of an arrow representing a magnetic flux line that links a winding is the direction of a flux line produced by positive magnetizing current flowing into the dotted terminal of the winding.

The volt-seconds impressed on primary winding sections 22a and 22b by the square-wave voltages V22a and V22b produce the triangular or ramp shaped flux waveform $\phi_a$, illustrated in FIG. 2c, with the flux being a generally positive-going ramp between times $t_1$–$t_3$ and being a generally negative-going ramp between times $t_3$–$t_4$. The magnetic flux density $B_a$ linking primary winding sections 22a and 22b is illustrated by the same waveform using, however, the scale and dimensional unit of gauss as indicated in FIG. 2c.

The primary core section 122a is sized so as to be maintained substantially unsaturated, magnetically, during the entire cycle of square-wave voltage V22a or V22b, when taking into account the input voltage amplitude and the number of turns selected for primary winding sections 22a and 22b. As illustrated in FIG. 2c, the peak flux density level attained in primary core section 122a is around 1000 gauss, well below the saturation flux density level of the primary core section material of, for example, manganese-zinc ferrite.

The regulated output voltage $V_{out}$ developed across capacitor C1 and secondary winding 22c of FIG. 4 is illustrated in FIG. 2f. The voltage $V_{out}$ is a phase delayed voltage relative to the primary winding section voltages V22a and V22b, as indicated by the later zero-crossover instant $t_2$ of the output voltage $V_{out}$ relative to the corresponding zero-crossover instant $t_1$ of the primary winding section voltages. Such a phase delay is required in a self-regulating transformer arrangement to enable the transfer of power from input terminal 23 to the load $R_L$. The amount of phase delay varies with changes in the value of load $R_L$ and with changes in the amplitude of the direct voltage applied to input terminal 23.

The sizing of core 122 is such as to enable, not only primary core section 122a, but also, secondary core section 122b to remain substantially unsaturated, magnetically, during the entire cycle of the primary and secondary winding voltages.

FIG. 2g illustrates the current $i_{C1}$ flowing in capacitor C1. This current is comprised of a resonant component 17 onto which is superimposed a ringing component 16 produced by the charging of filter capacitor C2 during the alternate conduction of diodes D1 and D2. The resonant current component 17 flows between secondary winding 22c and capacitor C1 and is produced by oscillation of the capacitor with the inductance exhibited by the winding.

The resonant current component 17 includes a magnetizing current to generate the resultant magnetic flux $\phi_b$ linking secondary winding 22c. The magnetic flux $\phi_b$ is illustrated in FIG. 2e and is generally of similar waveshape as the current component 17 of FIG. 2g. Alternately described, the magnetic flux $\phi_b$ is produced by the volt-seconds impressed on secondary winding 22c by the output voltage $V_{out}$, and lags the output voltage $V_{out}$ by approximately 90°.

One notes that in FIG. 2e, the maximum flux density level attained in secondary core section 122b is less than 2,000 gauss, well below the saturation flux density level of the manganese-zinc ferrite used as the secondary core section material. Because the core section 122b remains substantially unsaturated during the entire cycle of the output voltage $V_{out}$, the inductance of secondary winding 22c is relatively large even when core sections 122c and 122d magnetically saturate. Also the decrease in inductance exhibited by winding 22c when core sections 122c and 122d magnetically saturate is relatively small, less than 10 to 1 illustratively. In particular, winding 22c of FIG. 4 exhibits only a 2 to 1 or less decrease in inductance. In contrast, a conventional, ferroresonant transformer output winding may exhibit a substantial decrease in inductance when the saturating portion of the core saturates.

The flux $\phi_a$ in primary core section 122a, aided by the flux $\phi_b$ produced by the current from capacitor C1, results in a flux $\phi_s$ flowing in core sections 122c and 122d that substantially saturates the core sections 122c and 122d during each half cycle of the primary winding section voltage V22a or V22b, or the secondary winding voltage $V_{out}$. FIG. 2d illustrates the flux $\phi_s$ and flux density $B_s$ flowing in the center portion of the thin slabs 122c and 122d of FIG. 4, as measured by a one-turn search coil wound around the center portion of either slab 122c or 122d.

As illustrated in FIG. 2d, the peak flux density level, Bmax, attained in saturating core section 122c or 122d is around 3,000 gauss, which places the flux density level Bmax in the saturated region of the B-H curve characteristic of the lithium ferrite magnetizable material that forms the saturating core sections 122c and 122d.

The solid-line waveforms of FIGS. 3a–3e are the corresponding waveforms of FIG. 2 redrawn in FIG. 3. These waveforms are associated with operation of the self-regulating transformer arrangement of FIG. 4 at a low-line amplitude condition of the voltage $V_{in}$ relative to the nominal amplitude of illustratively +150V. The dashed-line waveforms of FIG. 3 illustrate a high-line amplitude condition. Both sets of waveforms in FIG. 3 are illustrative of a relatively heavy loading condition, as represented by the loading of resistor $R_L$.

As illustrated in FIG. 3b, the maximum flux level $\phi_a$ and flux density level $B_a$ obtained in primary core section 122a is greater for the high-line dashed-line waveform condition than for the low-line solid-line waveform condition. Primary core section 122a, however, remains substantially unsaturated in both high and low line conditions.

The larger amplitude flux levels in primary core section 122a produces the earlier magnetic saturation of the saturating core sections 122c and 122d, as illustrated in FIG. 2c. The maximum flux density level attained in saturating core sections 122c and 122d remain substantially unchanged around the level Bmax.

The earlier saturation of core sections 122c and 122d enables the output voltage $V_{out}$ to remain substantially unchanged in amplitude, half-cycle area, or both amplitude and half-cycle area when the input voltage $V_{in}$ increases in amplitude. As illustrated in FIG. 3e, at the high-line, dashed-line waveform condition, the output voltage $V_{out}$ changes very little in amplitude. To maintain approximately the same power transfer from input terminal 23 to load $R_L$ under the high-line condition, the phase delay of the output voltage $V_{out}$ relative to the primary winding section voltages V22a and V22b is reduced at the high-line condition relative to the low-line condition, as indicated by the earlier zero-crossover instant $t_{2'}$ of the dashed-line waveform compared to the zero-crossover instant $t_2$ of the solid-line waveform.

A further indication of the regulation action produced by the earlier saturation of core sections 122c and 122d is illustrated by the flux density waveform $B_b$ of FIG. 3d. The peak flux density level achieved in secondary core section 122b remains substantially unchanged between the high-line, dashed-line waveform condition and the low-line, solid-line waveform condition, even though the secondary core section flux density levels are in the unsaturated region of the corresponding B-H curve characteristic.

An alternate explanation of the self-regulating action provided by transformer 22 of FIGS. 1 and 4 is as follows. Because secondary core section 122b remains substantially unsaturated during the entire cycle of output voltage $V_{out}$, and because the inductance exhibited by output winding 22c changes relatively little between saturated and unsaturated intervals, secondary winding 22c and resonating capacitor C1 may be thought of as part of a substantially linear tuned circuit having a sufficiently high Q to effectively filter out most of the harmonics of the primary winding section voltage V22a or V22b. The Q of the output tank circuit can be maintained high because of the loose coupling via the core sections 122c and 122d between primary winding sections 22a and 22b and secondary winding 22c.

The two magnetically saturating core sections 122c and 122d couple energy to the tuned output tank circuit by an amount dependent upon the exact instants and duration of saturation of core sections 122c and 122d. The magnetic saturation characteristics of the core sections 122c and 122d allow controlled amounts of energy to be magnetically coupled from primary winding sections 22a and 22b to output secondary winding 22c to replace the energy lost by the tuned output tank circuit to the load $R_L$, thereby maintaining the magnitude of the output voltage relatively constant with line voltage and load fluctuations.

Several advantages accrue when using the self-regulating transformer arrangement of FIGS. 1 and 4 embodying the invention wherein the portion of the core 122 within the secondary winding remains unsaturated and wherein core saturation occurs in a portion of the core outside the secondary winding.

Firstly, because access to the saturating core portion is not obstructed by output conductor turns and winding housings, air cooling of the saturating core portions is enhanced and relatively large heat sinking structures can be placed in relatively close contact with the saturating core portions over a relatively large core area. The rise in core operating temperature above ambient that occurs after start-up of power supply operation is significantly reduced. The reduced downward drift of output voltage may be especially beneficial with respect to maintaining the scanning current of the deflection circuit relatively unchanged in amplitude during warmup.

Secondly, the secondary core section 122b is not required to magnetically saturate to achieve a self-regulating action. The cross-sectional area of the secondary core section 122b may therefore be made large enough to provide a relatively large volts per turn capability to each of the secondary windings 22c–22f of FIG. 1. A relatively large volts per turn capability is especially desirable in high voltage secondary winding 22f to keep the number of high voltage winding turns to an acceptable number. A high voltage rectifier arrangement that takes advantage of both the relatively large volts per turn capability exhibited by high voltage winding 22f and the substantially 50% duty cycle output voltage waveform being developed across that winding, is the stacked, voltage doubler arrangement described in the L. W. Nero U.S. patent application Ser. No. 297,791, filed Aug. 31, 1981, entitled "TELEVISION RECEIVER HIGH VOLTAGE GENERATOR", herein incorporated by reference.

Figure 5A:
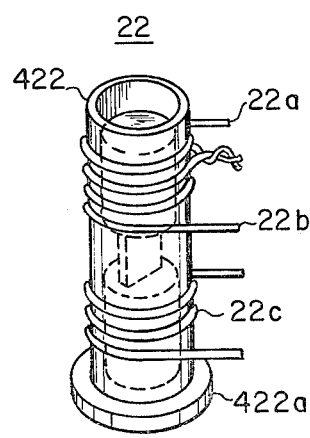
FIG. 5a illustrates, partially in schematic, an alternate arrangement of the transformer of FIG. 1.
Figure 5B:
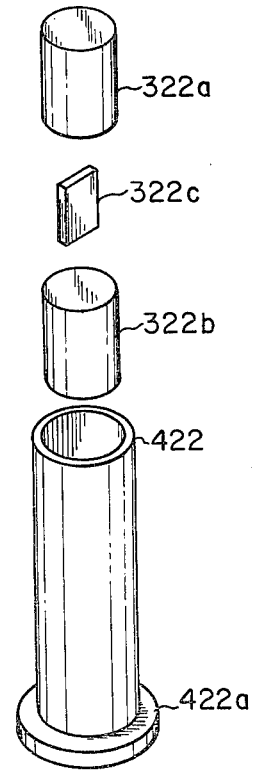

FIG. 5a illustrates another embodiment of a self-regulating transformer 22 embodying the invention wherein the return paths for magnetic flux lines linking either primary winding sections 22a and 22b or the secondary winding collectively illustrated by the winding 22c is substantially in air rather than in magnetizable material. FIG. 5b is the exploded perspective view of the transformer structure of FIG. 5a, without windings.

In FIGS. 5a and 5b, primary winding sections 22a and 22b are wound around the upper portion of a hollow, cylindrical, plastic bobin 422 and secondary winding 22c is wound around the lower portion. Bobbin 422 is open at the top to receive ferrite core pieces 322a, b, c and closed at the bottom by an enlarged base portion 422a, used for mounting transformer 22 in the power supply chassis.

The solid cylindrical ferrite core piece 322b is the first core piece inserted in bobbin 422 and is located within winding 22c. Next to be inserted is a saturating core slab of ferrite 322c. No turn of any of the windings 22a–22c is wound around the saturating core slab 322c. Last to be inserted is a solid cylindrical piece of ferrite material, core section 322a, located within primary winding sections 22a and 22b. The transformer arrangement of FIGS. 5a and 5b has the advantage of compact design and relatively small total volume of core material.

Figure 6:
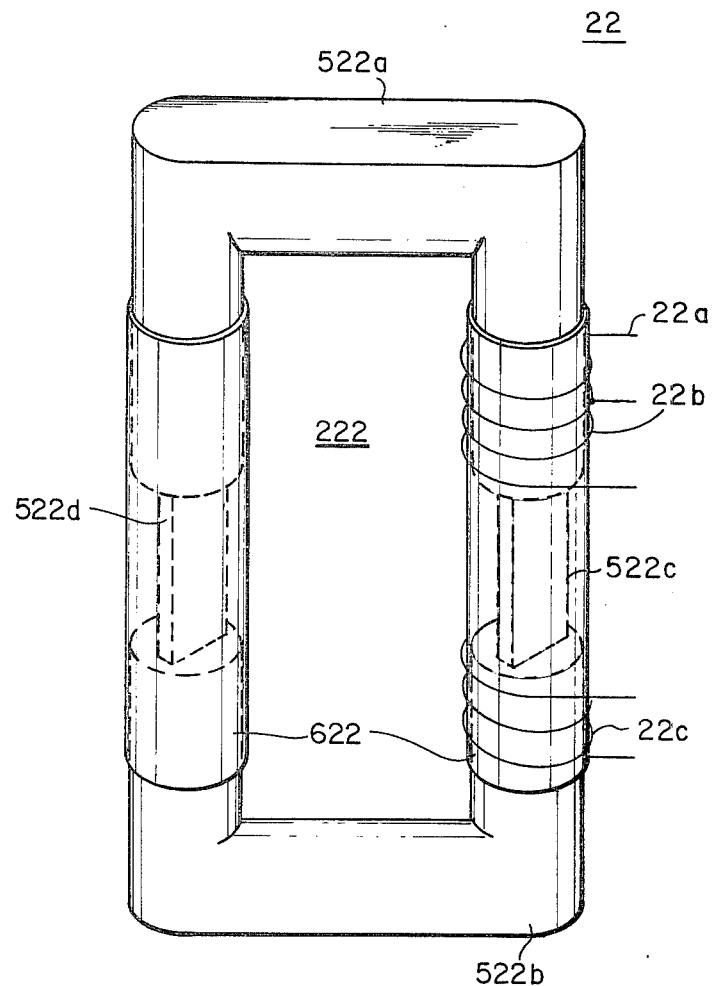
FIG. 6 illustrates an alternate arrangement, partially in schematic, of the transformer of FIG. 1.

FIG. 6 illustrates an alternate arrangement, partially in schematic, of a self-regulating saturating core transformer embodying the invention, wherein conventional clamping techniques may be used to mount the assembled transformer to the power supply chassis. In the transformer 22 of FIG. 6, the core 222 comprises two C-core pieces 522a and 522b and two rectangularly cross-sectioned thin slabs 522c and 522d. Plastic tubes 622 are provided that have an inner diameter slightly larger than the outer diameter of the legs of the C-core pieces 522a and 522b. Primary winding sections 22a and 22b are wound around one end of one of the plastic tubes 622; the secondary output windings, such as winding 22c, are wound around the other end of the same tube.

The two plastic tubes 622 are then slid in place over respective legs of one of the C-core pieces; slabs 522c and 522d are then inserted into the respective tubes; and respective legs of the other C-core piece are then inserted into the tubes 622 from the opposite ends of the tubes. Such an arrangement makes for a mechanically rigid support and simple assembly.

Since the material of the saturating core slabs 522c and 522d is of relatively small volume, the temperature rise in the slabs during power supply warmup is relatively small. Because the temperature rise is relatively small, the voids in the plastic tubes around the slabs may be filled with epoxy to make the mechanical assembly even more rigid. Alternatively, if cooling of the slabs is desired, holes may be cut in the plastic tubes 622 at the slab locations for air circulation.

I claim:

1. A television display system having an ultor terminal and a self-regulating, saturating core power supply for producing a regulated ultor voltage thereat, comprising:
   a source of alternating input voltage;
   a magnetizable core including first, second and third core sections;
   a first winding wound around said first core section;
   a second winding wound only around said second core section, said third core section providing a magnetic circuit path for magnetic flux lines that link both windings, said first winding being coupled to said input voltage source for developing an alternating polarity output voltage;
   an ultor terminal;
   means including a high voltage rectifier arrangement responsive to said output voltage and coupled to said ultor terminal for developing thereat an ultor voltage; and a capacitance coupled to said second winding for generating a current therein that aids in producing substantial magnetic saturation of said third core section during each cycle of said alternating polarity output voltage to provide regulation of said ultor voltage, said second core section remaining substantially unsaturated during the entirety of each cycle.

2. A television display system having a deflection circuit and a self-regulating, saturating core power supply for producing a regulated B+ voltage therefor, comprising:

a deflection winding;

a deflection generator energized by a B+ voltage for generating scanning current in said deflection winding;

a source of alternating input voltage;

a magnetizable core including first, second and third core sections;

a first winding wound around said first core section;

a second winding wound only around said second core section, said third core section providing a magnetic circuit path for magnetic flux lines that link both windings, said first winding being coupled to said input voltage source for developing an alternating polarity output voltage across said second winding;

means coupled to said deflection generator and responsive to said output voltage for developing therefrom said B+ voltage; and a capacitance coupled to said second winding for generating a current therein that aids in producing substantial magnetic saturation of said third core section during each cycle of said alternating polarity output voltage while maintaining said second core section substantially unsaturated to provide regulation of said B+ voltage.

3. A television display system according to claims 1 or 2 wherein the magnetizable material of said third core section comprises a lithium ferrite or a substituted lithium ferrite.

4. A television display system according to claims 1 or 2 wherein said magnetizable core is constructed as a generally rectangularly shaped core with said first and second core sections being part of respectively opposing legs and with said third core section being part of a third leg.

5. A television display system according to claim 4 wherein the magnetizable material of said third core section comprises one of a lithium ferrite and a substituted lithium ferrite and wherein the remainder of said magnetizable core comprises a ferrite other than said one ferrite.

6. A television display system according to claim 5 wherein said other ferrite comprises a manganese-zinc ferrite.

7. A television display system according to claim 1 including means responsive to said output voltage for developing therefrom a B+ voltage, a deflection winding, and a deflection generator energized by said B+ voltage for generating scanning current in said deflection winding.

8. A television display system according to claim 2 including an ultor terminal, a high voltage winding relatively tightly coupled magnetically to said second winding for stepping up said output voltage, and a rectifier arrangement coupled to said high voltage winding and to said ultor terminal for producing thereat an ultor voltage.

9. A self-regulated, saturating core power supply for producing a regulated voltage to energize a television display system load circuit, comprising:

a source of alternating input voltage;

a magnetizable core having first, second and third magnetic paths for flux lines, said third magnetic path interconnecting the other two paths;

a first winding wound around a core section of said first path;

a second winding wound around a core section of said second path, the core section of said third path being free of conductor turns of said second winding, said first winding being coupled to said input voltage source for generating flux lines that link both windings through said third path to develop an alternating polarity output voltage;

means including a capacitance for producing resonant oscillation in said second winding that generates magnetic flux lines that aid in producing substantial magnetic saturation in the core section of said third path during each cycle of said alternating polarity output voltage, to thereby regulate said output voltage, the core section of said second path remaining substantially unsaturated during the entirety of each cycle to enable said second winding to exhibit relatively little change in inductance between saturated and unsaturated intervals; and a load circuit within said television display system energized by said regulated output voltage.

10. A power supply according to claim 9 wherein said third magnetic path interconnects the other two magnetic paths such that the magnetic coupling between said first and second winding decreases when the core section of said third path becomes magnetically saturated.

11. A power supply according to claim 10 wherein the magnetizable material of the core section of said third path comprises a lithium ferrite or a substituted lithium ferrite.

12. A power supply according to claim 10 wherein said magnetizable core is constructed as a generally rectangularly shaped core with said first and second paths being part of respectively opposing legs and with said third path being part of a third leg.

13. A power supply according to claim 12 wherein the magnetizable material of the core section of said third path comprises one of a lithium ferrite and a substituted lithium ferrite and wherein the remainder of said magnetizable core comprises a ferrite other than said one ferrite.

14. A television display system according to claim 13 wherein said other ferrite comprises a manganese-zinc ferrite.

15. A power supply according to claims 9, 10 or 12 wherein said load circuit includes an ultor terminal, a high voltage winding relatively tightly coupled magnetically to said second winding for stepping up said output voltage, and a rectifier arrangement coupled to said high voltage winding and to said ultor terminal for producing thereat an ultor voltage.

16. A power supply according to claims 9, 10 or 12 wherein said load circuit includes means responsive to said output voltage for developing therefrom a B+ voltage, a deflection winding, and a deflection generator energized by said B+ voltage for generating scanning current in said deflection winding.

17. Apparatus according to claims 1, 2 or 9 wherein the decrease in the inductance exhibited by said second winding when magnetic saturation occurs is less than a 10 to 1 decrease.

18. Apparatus according to claims 1, 2 or 9 wherein the decrease in the inductance exhibited by said second winding when magnetic saturation occurs is a 2 to 1 or less decrease.

* * * * *